US011386002B2

(12) United States Patent
Wu et al.

(10) Patent No.: US 11,386,002 B2
(45) Date of Patent: Jul. 12, 2022

(54) ENHANCING SOLID-STATE STORAGE DEVICE SPEED PERFORMANCE THROUGH STREAM-AWARE GARBAGE COLLECTION

(71) Applicant: ScaleFlux, Inc., San Jose, CA (US)

(72) Inventors: Qi Wu, San Jose, CA (US); Tong Zhang, Albany, NY (US)

(73) Assignee: SCALEFLUX, INC., San Jose, CA (US)

(*) Notice: Subject to any disclaimer, the term of this patent is extended or adjusted under 35 U.S.C. 154(b) by 469 days.

(21) Appl. No.: 16/591,722

(22) Filed: Oct. 3, 2019

(65) Prior Publication Data
US 2020/0110697 A1 Apr. 9, 2020

Related U.S. Application Data

(60) Provisional application No. 62/741,022, filed on Oct. 4, 2018.

(51) Int. Cl.
G06F 12/02 (2006.01)

(52) U.S. Cl.
CPC ...... *G06F 12/0253* (2013.01); *G06F 12/0246* (2013.01); *G06F 2212/1024* (2013.01)

(58) Field of Classification Search
CPC ............. G06F 12/0253; G06F 12/0246; G06F 2212/1026; G06F 2212/7205
See application file for complete search history.

(56) References Cited

U.S. PATENT DOCUMENTS

| 3,937,945 | A  | * | 2/1976 | Fitzmaurice | ......... | H04B 10/505 |
| | | | | | | 398/124 |
| 4,573,255 | A  | * | 3/1986 | Gordon | .................... | H01S 5/223 |
| | | | | | | 148/DIG. 162 |
| 8,769,190 | B1 | * | 7/2014 | Syu | ......................... | G06F 3/064 |
| | | | | | | 711/173 |
| 11,240,284 | B1 | * | 2/2022 | Gonzalez | ............... | H04N 19/00 |
| 2011/0022778 | A1 | * | 1/2011 | Schibilla | ............. | G06F 12/0246 |
| | | | | | | 711/170 |

(Continued)

OTHER PUBLICATIONS

B. Debnath, S. Krishnan, W. Xiao, D. J. Lilja and D. H. C. Du, "Sampling-based garbage collection metadata management scheme for flash-based storage," 2011 IEEE 27th Symposium on Mass Storage Systems and Technologies (MSST), 2011, pp. 1-6. (Year: 2011).*

(Continued)

*Primary Examiner* — Ramon A. Mercado
(74) *Attorney, Agent, or Firm* — Hoffman Warnick LLC

(57) ABSTRACT

Methods for enhancing the speed performance of solid-state storage devices using stream-aware garbage collection. A garbage collection method in according to an embodiment includes: searching, in each of a plurality of super-block groups G, for a super-block set C that satisfies: all of the super-blocks m within the super-block set C in the super-block group G contain a lesser amount of valid data than the other super-blocks within the super-block group G; and a total amount of valid data within the super-block set C are just enough to complete an entire super-block; selecting the super-block group G that includes the super-block set C with the maximum number of super-blocks m; and performing garbage collection on the super-block set C in the selected super-block group G.

10 Claims, 7 Drawing Sheets

(56) References Cited

U.S. PATENT DOCUMENTS

| | | | |
|---|---|---|---|
| 2012/0059976 A1* | 3/2012 | Rosenband | G06F 3/061 |
| | | | 711/170 |
| 2017/0052719 A1* | 2/2017 | Boitei | G06F 12/0246 |
| 2017/0123655 A1* | 5/2017 | Sinclair | G06F 3/061 |
| 2017/0192687 A1* | 7/2017 | Huo | G06F 3/0616 |
| 2017/0285954 A1* | 10/2017 | Fan | G06F 3/0619 |
| 2017/0286286 A1* | 10/2017 | Szubbocsev | G06F 12/0246 |
| 2018/0373431 A1* | 12/2018 | Kathawala | G06F 3/0619 |
| 2019/0087327 A1* | 3/2019 | Kanno | G06F 12/0261 |
| 2019/0205043 A1* | 7/2019 | Huang | G06F 3/065 |
| 2020/0110697 A1* | 4/2020 | Wu | G06F 12/0246 |
| 2021/0240614 A1* | 8/2021 | Gorobets | G06F 12/0253 |

OTHER PUBLICATIONS

Darko Stefanović, Kathryn S. McKinley, and J. Eliot B. Moss. 1999. Age-based garbage collection. In Proceedings of the 14th ACM SIGPLAN conference on Object-oriented programming, systems, languages, and applications (OOPSLA '99). Association for Computing Machinery, New York, NY, USA, 370-381. (Year: 1999).*

\* cited by examiner

ENHANCING SOLID-STATE STORAGE DEVICE SPEED PERFORMANCE THROUGH STREAM-AWARE GARBAGE COLLECTION

TECHNICAL FIELD

The present disclosure relates to the field of solid-state data storage, and particularly to enhancing the speed performance of solid-state storage devices using stream-aware garbage collection.

BACKGROUND

Solid-state data storage devices, which use non-volatile NAND flash memory technology, are being pervasively deployed in various computing and storage systems. In addition to including one or multiple NAND flash memory chips, each solid-state data storage device also contains a controller that manages all the NAND flash memory chips.

NAND flash memory cells are organized in an array →block →page hierarchy, where one NAND flash memory array is partitioned into a large number (e.g., thousands) of blocks, and each block contains a number (e.g., hundreds) of pages. Data are programmed and fetched in the unit of a page. The size of each flash memory page typically ranges from 8 kB to 32 kB, and the size of each flash memory block is typically tens of MBs.

NAND flash memory cells must be erased before being re-programmed, with the erase operation carried out in the unit of a block (i.e., all pages within the same block must be erased at the same time). Due to the unit size mismatch between write/read (e.g., page) and erase (e.g., block) operations, the storage device controller must carry out a garbage collection (GC) operation: before erasing a flash memory block, the controller copies all valid data from the block to other flash memory block(s). The purpose of GC is to reclaim flash memory storage space being occupied by stale flash memory pages, whose content have become invalid and useless, and make the storage space available to serve future write requests. To simplify flash memory management and improve data read/write throughput, modern solid-state storage devices carry out the GC operation in the unit of a super-block. Each super-block contains multiple physical flash memory blocks that can be read and written in parallel.

GC operations incur extra NAND flash memory read/write operations, which interfere with normal read/write requests and hence degrade the speed performance of solid-state storage devices. In one method for reducing the overhead of GC operations, data with a similar lifetime (i.e., the time duration that the data must reside in flash memory before becoming invalid) are written into the same super-block (e.g., using multi-stream data write). The basic idea can be described as follows: solid-state storage devices internally keep multiple super-blocks open for receiving new data. Let n denote the number of super-blocks that are open at the same time. Solid-state storage devices categorize all the incoming data into n groups according to their expected lifetime so that all the data in the same group tend to have a similar expected lifetime. Each group is assigned to one open super-block, and all the data belonging to the same group are written into the associated super-block.

SUMMARY

Accordingly, embodiments of the present disclosure are directed to methods for enhancing the speed performance of solid-state storage devices using stream-aware garbage collection.

A first aspect of the disclosure is directed to a garbage collection method in a solid-state storage device, including: searching, in each of a plurality of super-block groups G, for a super-block set C that satisfies: all of the super-blocks m within the super-block set C in the super-block group G contain a lesser amount of valid data than the other super-blocks within the super-block group G; and a total amount of valid data within the super-block set C are just enough to complete an entire super-block; selecting the super-block group G that includes the super-block set C with the maximum number of super-blocks m; and performing garbage collection on the super-block set C in the selected super-block group G.

A second aspect of the disclosure is directed to a garbage collection method in a solid-state storage device, including: estimating a lifetime of data in each of a plurality of super-block groups G; assigning a scaling factor s to each super-block group G based on its estimated data lifetime; searching, in each of the plurality of super-block groups G, for a super-block set C in the super-block group G that satisfies: all of the super-blocks m within the super-block set C contain a lesser amount of valid data than the other super-blocks within the super-block group G; and a total amount of valid data within the super-block set C are just enough to complete an entire super-block; selecting the super-block group G that includes the super-block set C with a highest weighted parameter p, wherein $p=s*m$; and performing garbage collection on the super-block set C in the selected super-block group G.

A third aspect of the disclosure is directed to a garbage collection method in a solid-state storage device, including: searching a plurality of super-block groups G for a super-block set C that satisfies: all of the super-blocks within the super-block set C contain a lesser amount of valid data than the other super-blocks; and a total amount of valid data within the super-block set C are just enough to completely fill s >1 super-blocks; estimating a residual lifetime of the valid data in the super-block set C; sorting the valid data in the super-block set C according to the estimated residual lifetime of the valid data; and performing garbage collection on the super-block set C.

BRIEF DESCRIPTION OF THE DRAWINGS

The numerous advantages of the present disclosure may be better understood by those skilled in the art by reference to the accompanying figures.

DETAILED DESCRIPTION

Reference will now be made in detail to embodiments of the disclosure, examples of which are illustrated in the accompanying drawings.

Figure 1:
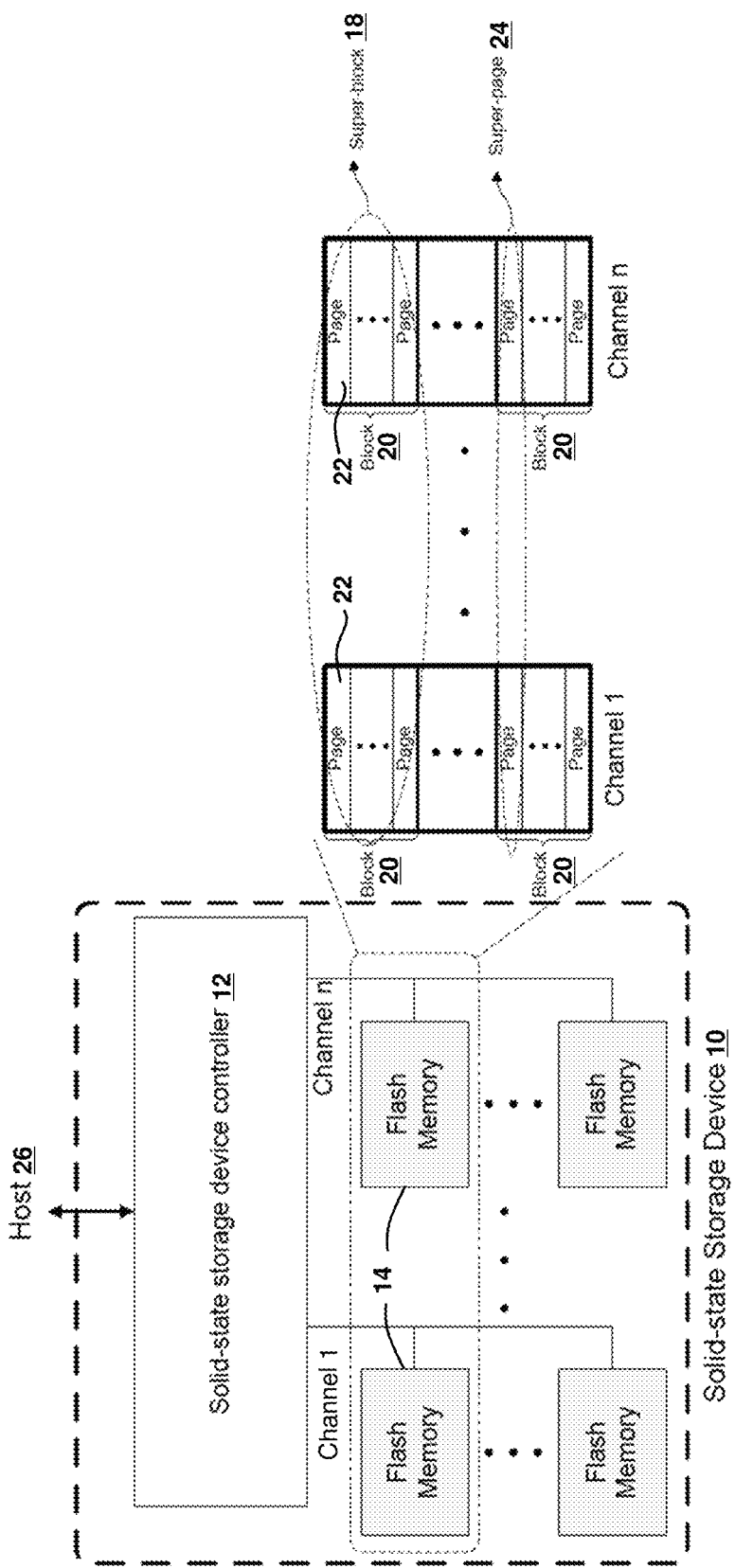
FIG. 1 illustrates the multi-channel architecture of a solid-state storage device according to embodiments.

FIG. 1 illustrates the multi-channel architecture of a NAND solid-state storage device 10 (hereafter storage device 10) according to embodiments. A solid-state storage device controller 12 (hereafter controller 12) organizes a plurality of NAND flash memory chips 14 (hereafter memory chips 14) into a plurality of channels, with each channel connected to one or more memory chips 14. Memory chips 14 on different channels can be accessed in parallel to improve data read/write throughput in the storage device 10.

To simplify flash memory management and fully leverage the multi-channel architecture, the garbage collection (GC) operation is carried out in the unit of a super-block 18. For example, when the GC operation selects a super-block 18 to reclaim its storage space, the GC operation first copies all the valid data from the chosen super-block to another super-block, and then erases all the flash memory blocks in the chosen super-block.

As illustrated in FIG. 1, spanning across all the channels, each super-block 18 contains multiple physical flash memory blocks 20, with one block 20 per channel. Since each flash memory block 20 includes a certain number (e.g., 256) of pages 22 and flash memory programming is performed in the unit of a page 22, each super-block 18 further contains a certain number (e.g., 256) of super-pages 24. As illustrated in FIG. 1, each super-page 24 includes a certain number of flash memory pages 22 from different flash memory blocks 20 spanning all the channels. To achieve high data write throughput inside the storage device 10, the controller 12 writes the data to one super-page 24 in parallel through the multiple independent channels.

Figure 2:
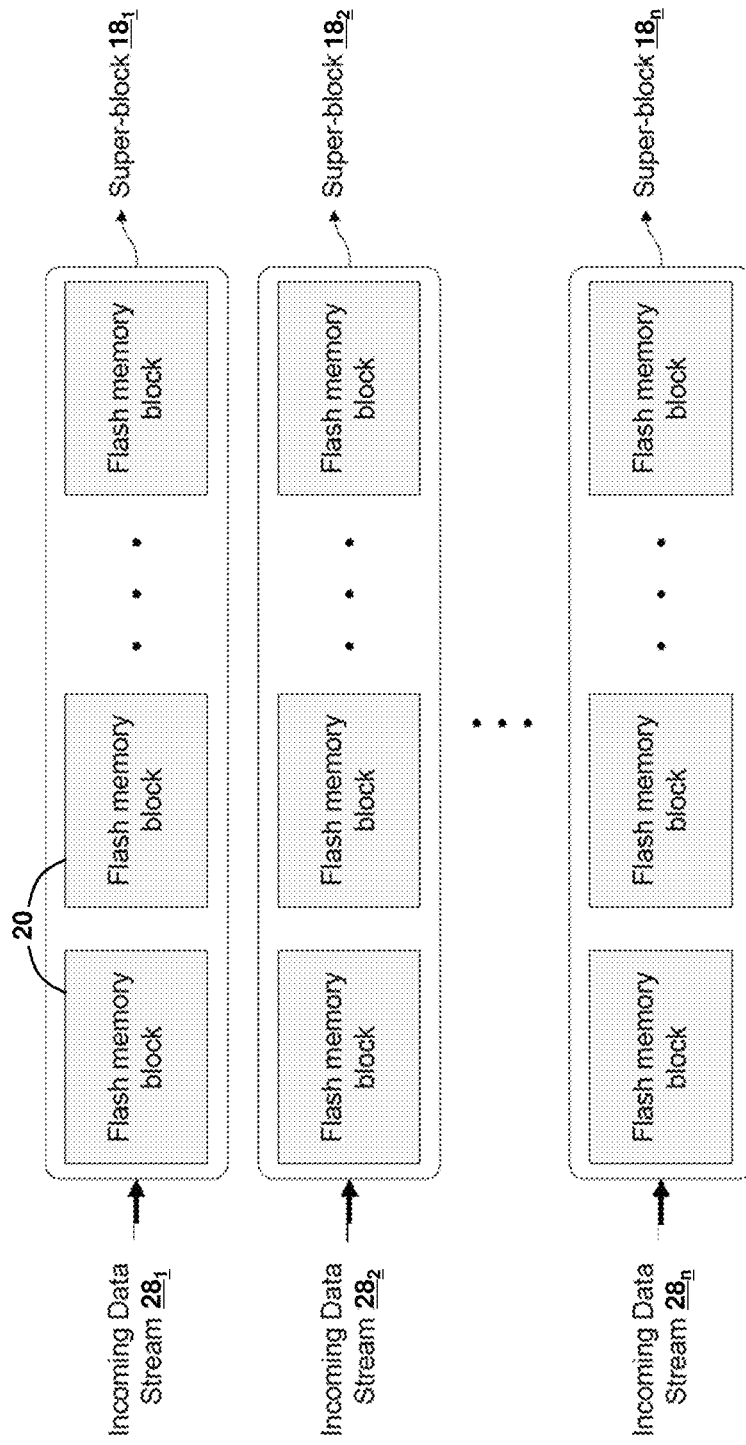
FIG. 2 illustrates the use of multi-stream data write in modern solid-state data storage devices.

The controller 12 carries out garbage collection (GC) to reclaim flash memory storage space. However, GC operations incur extra NAND flash memory read/write operations, which interfere with normal read/write requests and hence degrade the speed performance of the storage device 10. One method for reducing the overhead of GC operations involves writing data with similar a lifetime into the same super-block 18, often referred to as multi-stream data write. The concept of multi-stream data write and the deficiencies of the conventional method for performing multi-stream data write are described below with regard to FIGS. 2 and 3.

Solid-state storage devices, such as storage device 10, internally keep multiple super-blocks 18 open for receiving new data (e.g., from a host computer 26). Let n denote the number of super-blocks 18 that are open at the same time. The controller 12 categorizes all the incoming data into n streams 28 according to their expected lifetime so that all the data in the same group tend to have a similar expected lifetime. Each data stream 28 is assigned to one open super-block 18, and all the data belonging to the same stream 28 are written into the associated super-block 18.

Figure 3:
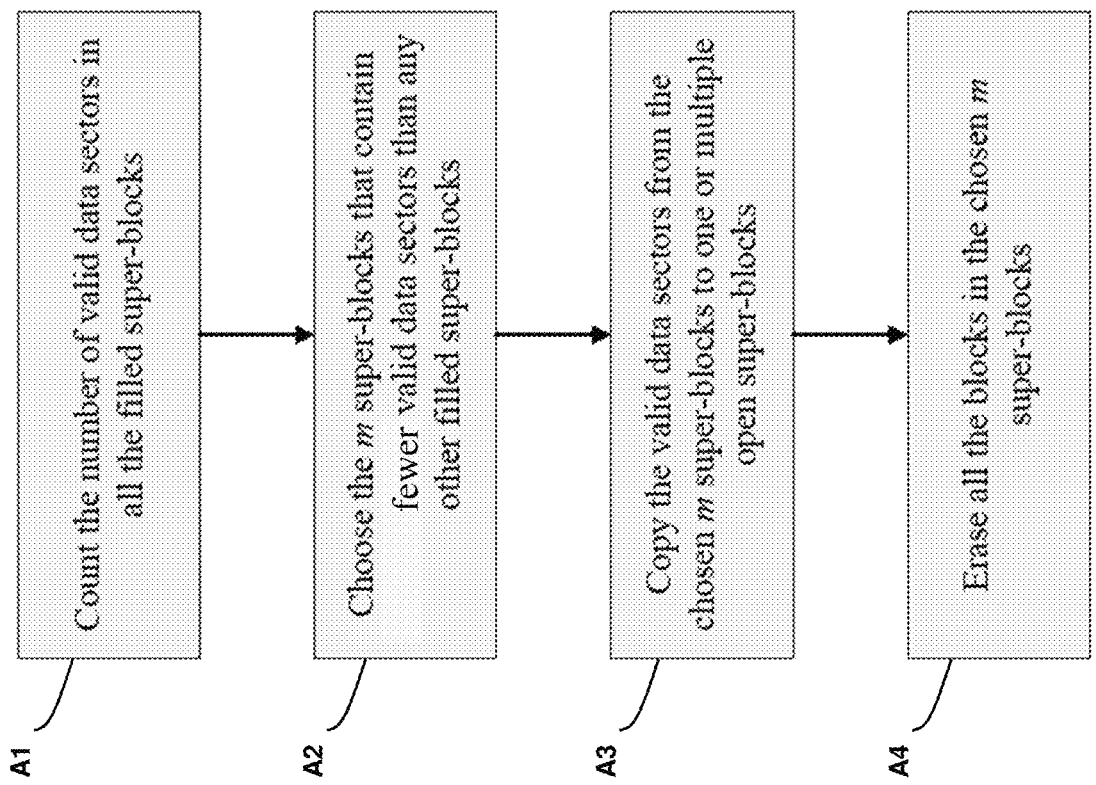
FIG. 3 depicts a flow diagram of a conventional garbage collection process.

FIG. 3 depicts a flow diagram of a conventional garbage collection (GC) operation. During the GC operation performed by the controller 12, the to-be-reclaimed super-block 18 is chosen simply based on the number of valid data sectors (each sector is typically 512B or 4 kB) in each super-block 18. In particular, at process A1, the controller 12 counts the number of valid data sectors in all of the filled super-blocks 18. At process A2, the controller 12 chooses the m super-blocks that contain fewer valid data sectors than any other filled super-blocks 18. At process A3, the controller 12 copies the valid data sectors from the chosen m super-blocks 18 to one or multiple open super-blocks 18. At process A4, the controller erases all of the blocks in the chosen m super-blocks 18. However, in the presence of multi-stream data write, such a conventional GC operation may mix data with largely different lifetimes into one super-block 18, which will result in higher GC overhead in subsequent operations.

Figure 4:
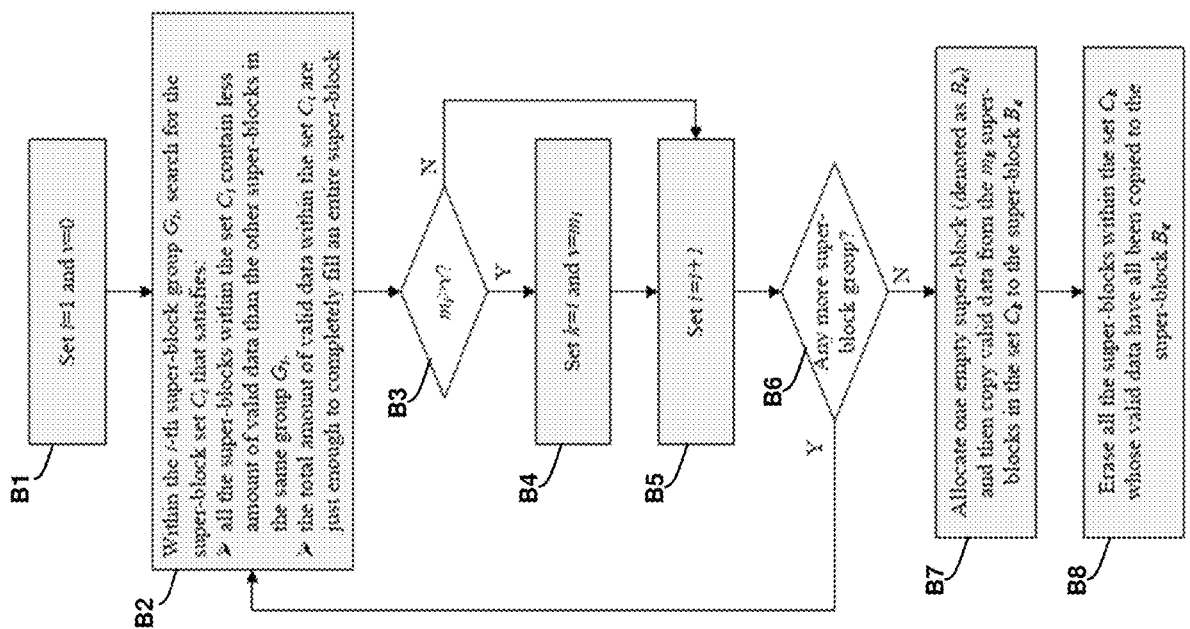
FIG. 4 depicts a flow diagram of a process for enhancing garbage collection according to embodiments.

According to embodiments, a plurality of techniques are described herein for modifying and enhancing a GC operation to reduce the mixing of data with largely different lifetimes in a super-block 18 during the GC operation. FIG. 4 depicts a flow diagram of a first process for enhancing GC according to embodiments.

Recall that n denotes the total number of data write streams. All of the filled super-blocks 18 fall into n groups, where each group is associated with one write stream. According to embodiments, the GC operation performed by the controller 12 is constrained within one super-block group. Let $G_1, G_2, \ldots, G_n$ denote the n super-block groups associated with the n different write streams. When the GC operation needs to reclaim the storage space of some filled super-blocks 18, it chooses super-blocks 18 only from one super-block group.

At process B1 in FIG. 4, i and v are set to 0 (i=0, v=0). At process B2, for each group $G_i$ of super-blocks 18, the GC operation searches for the super-block set $C_i$ that satisfies the following two conditions: (1) all of the super-blocks 18 within the super-block set $C_i$ contain a lesser amount of valid data than the other super-blocks 18 in the same group $G_i$ of super-blocks; and (2) the total amount of valid data within the super-block set $C_i$ are just enough to completely fill an entire super-block 18 (i.e., removing any super-block 18 from the super-block set $C_i$ will make the total amount of valid data in the super-block set $C_i$ not enough to fill an entire super-block 18).

Let $m_i$ denote the number of super-blocks 18 in the super-block set $C_i$. As illustrated in processes B3-B6 in FIG. 4, after the GC operation examines all the super-block groups $G_i$, the GC operation chooses the super-block group $G_i$ with the super-block set $C_i$ with the maximum number of super-blocks $m_i$. Let $G_k$ denote the chosen super-block group, i.e., the super-block set $C_k$ in the super-block group $G_k$ contains the most super-blocks 18, and let $m_k$ denote the number of super-blocks 18 in the set $C_k$. At process B7, the GC operation allocates one empty super-block 18 (denoted as $B_e$) and then copies valid data from the $m_k$ super-blocks 18 in the set $C_k$ to the super-block $B_e$. At process B8, after the super-block $B_e$ is completely filled, all of the super-blocks 18 within the set $C_k$ whose valid data have all been copied to the super-block $B_e$ are erased.

The above presented technique aims to carry out the GC operation within each super-block group. However, it does not take into account the data lifetime difference among different super-block groups (and hence different write streams). To this extent, according to additional embodiments, the GC operation is further enhanced by taking into account the data lifetime difference. This technique first uses a sampling-based method to estimate the data lifetime statistics of different super-block groups (and hence different write streams).

Figure 5:
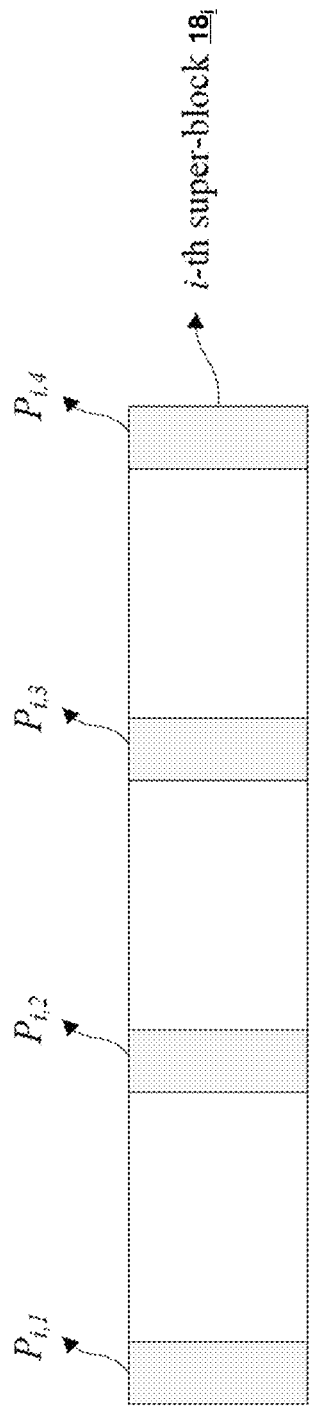
FIG. 5 illustrates the use of a sampling-based method to estimate the data lifetime statistics of different super-block groups according to embodiments.

As illustrated in FIG. 5, within each super-block 18, we choose a small fixed number (e.g., 4) of physical pages $P_i$ at fixed locations in the super-block 18, and maintain a table to record the time when data are being written to each physical page $P_i$ and when the data at the physical page $P_i$ are no longer valid. For each chosen physical page $P_{i,j}$, let $w_{i,j}$ denote the time when data are being written into $P_{i,j}$ and let $d_{i,j}$ denote the time when data are no longer valid. Then the difference $d_{i,j} - w_{i,j}$ is the lifetime of the data being stored in the physical page $P_{i,j}$. Based on the lifetime of the sampled data within each super-block group (hence each write steam), overall data lifetime statistics such as average data lifetime of each write stream can be easily estimated.

Figure 6:
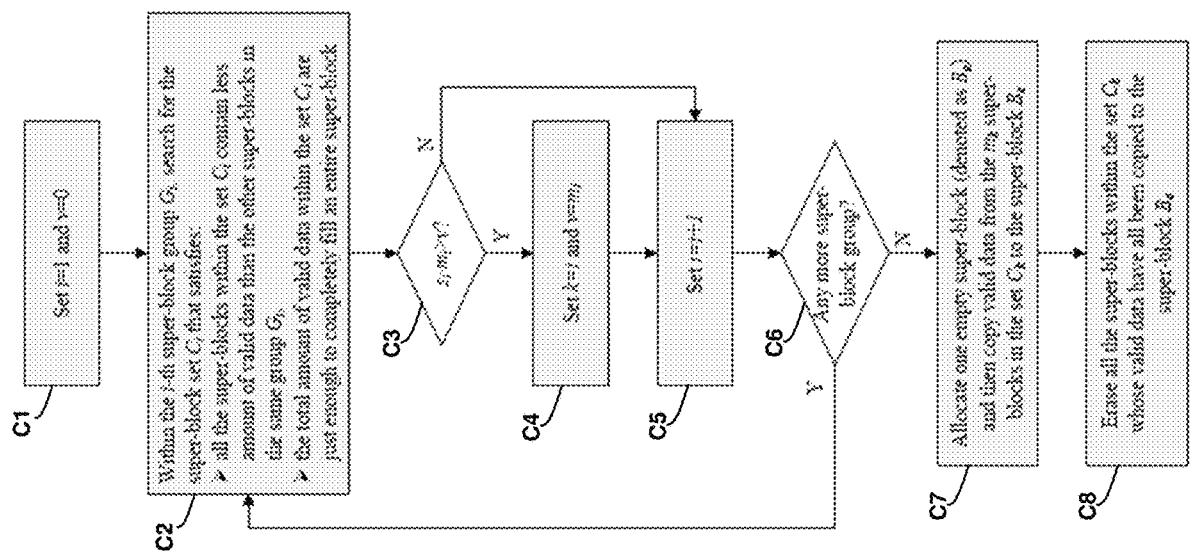
FIG. 6 depicts a flow diagram of a process for enhancing garbage collection according to additional embodiments.

Using the sampling-based data lifetime estimation method described above, the GC operation monitors the data lifetime statistics for each write-stream and accordingly assigns a scaling factor $s_i$ to each write stream (i.e., each super-block group $G_i$). The longer the data lifetime of a write-stream, the larger its scaling factor $s_i$. FIG. 6 depicts a flow diagram of a process for enhancing garbage collection according to additional embodiments, which takes into account the data lifetime difference.

At process C1 in FIG. 6, i and v are set to 0 (i=0, v=0). At process C2, for each group $G_i$ of super-blocks 18, the GC operation searches for the super-block set $C_i$ that satisfies the following two conditions: (1) all of the super-blocks 18 within the super-block set $C_i$ contain a lesser amount of valid data than the other super-blocks 18 in the same group $G_i$; and (2) the total amount of valid data within the super-block set $C_i$ are just enough to completely fill an entire super-block 18 (i.e., removing any super-block 18 from the super-block set $C_i$ will make the total amount of valid data in the super-block set a not enough to fill an entire super-block 18).

Let $m_i$ denote the number of super-blocks 18 in the super-block set $C_i$. At process C3, $m_i$ is multiplied by the corresponding scaling factor $s_i$ for the super-block group $G_i$ to obtain a weighted parameter $p_i=s_i \cdot m_i$. At processes C4-C6, after the GC operation examines all of the super-block groups $G_i$, the GC operation chooses the super-block group $G_i$ with the largest weighted parameter $p_i$. Let $G_k$ denote the chosen super-block group that has the largest weighted parameter $p_k$, and let $m_k$ denote the number of super-blocks 18 in the set $C_k$. At process C7, the GC operation allocates one empty super-block 18 (denoted as $B_e$) and then copies valid data from the $m_k$ super-blocks 18 in the set $C_k$ to the super-block $B_e$. At process C8, after the super-block $B_e$ is completely filled, all of the super-blocks 18 within the set $C_k$ whose valid data have all been copied to the super-block $B_e$ are erased.

Figure 7:
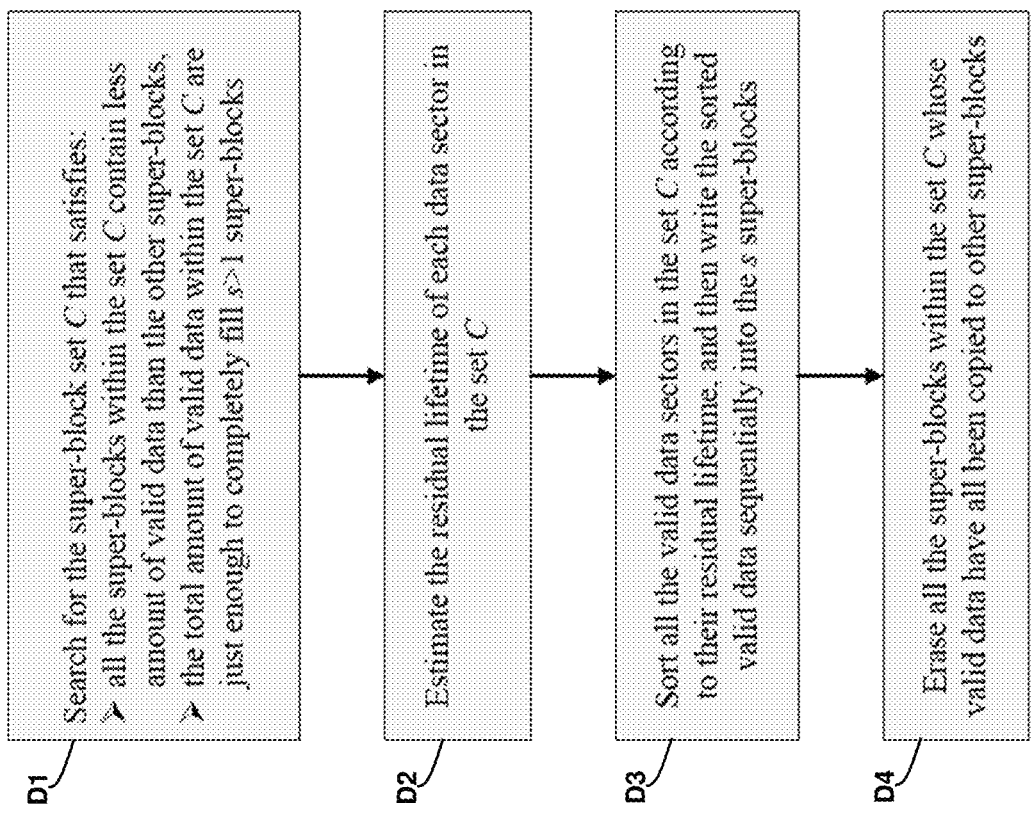
FIG. 7 depicts a flow diagram of a process for enhancing garbage collection according to further embodiments.

Both of the above-described GC operations choose to-be-erased super-blocks 18 from the same super-block group (hence the same write stream). According to additional embodiments, as depicted in FIG. 7, the GC operation is further enhanced by choosing to-be-erased super-blocks 18 from all the super-block groups. At process D1, the GC operation searches all the super-block groups to find a super-block set C that satisfies the following two conditions: (1) all the super-blocks 18 within the super-block set C contain a lesser amount of valid data than the other super-blocks 18, (2) the total amount of valid data within the super-block set C are just enough to completely fill s>1 super-blocks 18. Based upon the data lifetime statistics obtained, for example, using the above sampling-based method, for each valid data sector in the super-block set C, the following information can be estimated: (1) the average data lifetime of the write stream to which this data sector belongs (e.g., determined as described above); and (2) the time when this data sector is written to the super-block 18. At process D2, by subtracting these two values, the residual lifetime of each valid data sector can be estimated. At process D3, all of the valid data sectors in the super-block set C are sorted according to their residual lifetimes, and the sorted valid data is sequentially written into s empty super-blocks. As a result, within each of the s super-blocks, data tend to have similar residual lifetimes. Finally, at process D4, all of the super-blocks 18 within the super-block set C whose valid data have all been copied to other super-blocks 18 are erased.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A garbage collection method in a solid-state storage device, comprising:
    estimating a lifetime of data in each of a plurality of super-block groups G using a sampling-based method;
    assigning a scaling factor s to each super-block group G based on its estimated data lifetime;
    searching, in each of the plurality of super-block groups G, for a super-block set C in the super-block group G that satisfies:
        all of the super-blocks m within the super-block set C contain a lesser amount of valid data than the other super-blocks within the super-block group G; and
        a total amount of valid data within the super-block set C are just enough to complete an entire super-block;
    selecting the super-block group G that includes the super-block set C with a highest weighted parameter p, wherein p=s*m; and
    performing garbage collection on the super-block set C in the selected super-block group G,
    wherein the sampling-based method further comprises, for each of the plurality of super-block groups G:
        selecting a plurality of physical pages in at least one super-block of the super-block group G;
        obtaining a lifetime of the data in each of the selected physical pages by determining a difference between a time when data is written to each of the plurality of physical pages and a time when the data written to each of the plurality of physical pages is no longer valid; and
        estimating the lifetime of the super-block group G based on the lifetime of the data in each of the selected physical pages in the at least one super-block.

2. The method according to claim 1, wherein performing garbage collection on the super-block set C in the selected super-block group G further includes:
    allocating an empty super-block;
    copying the valid data from the all of the super-blocks in the super-block set C in the selected super-block group G to the allocated super-block; and
    erasing the super-blocks in the super-block set C in the selected super-block group G whose valid data has been copied to the allocated super-block.

3. The method according to claim 1, wherein the solid-state storage device comprises a NAND flash memory storage device.

4. The method according to claim 1, wherein selecting the plurality of physical pages in at least one super-block of the super-block group G further comprises selecting a fixed number of physical pages at fixed locations within the at least one super-block.

5. The method according to claim 1, wherein scaling factor assigned to each super-block group G is proportional to the estimated lifetime of the super-block group G.

6. A solid-state storage device, comprising:
    memory; and
    a controller, wherein the controller is configured to perform garbage collection on the memory by performing a method including:
        estimating a lifetime of data in each of a plurality of super-block groups G using a sampling-based method;
        assigning a scaling factor s to each super-block group G based on its estimated data lifetime;
        searching, in each of the plurality of super-block groups G, for a super-block set C in the super-block group G that satisfies:
            all of the super-blocks m within the super-block set C contain a lesser amount of valid data than the other super-blocks within the super-block group G; and
            a total amount of valid data within the super-block set C are just enough to complete an entire super-block;
        selecting the super-block group G that includes the super-block set C with a highest weighted parameter p, wherein p=s*m; and
        performing garbage collection on the super-block set C in the selected super-block group G,
        wherein the sampling-based method further comprises, for each of the plurality of super-block groups G:
            selecting a plurality of physical pages in at least one super-block of the super-block group G;

obtaining a lifetime of the data in each of the selected physical pages by determining a difference between a time when data is written to each of the plurality of physical pages and a time when the data written to each of the plurality of physical pages is no longer valid; and estimating the lifetime of the super-block group G based on the lifetime of the data in each of the selected physical pages in the at least one super-block.

7. The solid-state storage device according to claim 6, wherein performing garbage collection on the super-block set C in the selected super-block group G further includes:
allocating an empty super-block;
copying the valid data from the all of the super-blocks in the super-block set C in the selected super-block group G to the allocated super-block; and
erasing the super-blocks in the super-block set C in the selected super-block group G whose valid data has been copied to the allocated super-block.

8. The solid-state storage device according to claim 6, wherein the solid-state storage device comprises a NAND flash memory storage device.

9. The solid-state storage device according to claim 6, wherein selecting the plurality of physical pages in at least one super-block of the super-block group G further comprises selecting a fixed number of physical pages at fixed locations within the at least one super-block.

10. The solid-state storage device according to claim 6, wherein scaling factor assigned to each super-block group G is proportional to the estimated lifetime of the super-block group G.

* * * * *